UNITED STATES PATENT OFFICE.

ISAIAH JENNINGS, OF NEW YORK, N. Y.

IMPROVED COMPOSITION FOR BURNING IN LAMPS.

Specification forming part of Letters Patent No. 1,453, dated December 31, 1839.

*To all whom it may concern:*

Be it known that I, ISAIAH JENNINGS, of the city of New York, in the State of New York, have invented or discovered a new combination of ingredients to be used as a substitute for oil and other combustible fluids in the various kinds of lamps now in use; and I do hereby declare that the following is a full and exact description thereof.

In the process of distilling whisky for making alcohol or high-wines it is now the practice with some distillers to commence the operation by subjecting the whisky in the still to a much more intense degree of heat than heretofore, and as the progress of rectification proceeds to lower the fire to the ordinary temperature. The effect of this high temperature is, in the first instance, to drive over a liquor possessed of peculiar properties intimately related to those of the essential oils. The quantity of this liquid obtained from different parcels of whisky will differ; but I think that it will vary but little from two or three gallons to one hundred gallons of common whisky. Its specific gravity is the same, as nearly as may be, with spirits of turpentine, and its reaction is in many cases similar. It is extremely high flavored, and brings over with it all the highly-odorous matter contained in the whisky, and has consequently an offensive smell. The reason for adopting this process by the distiller is that by driving over this oil or spirit, which I shall designate by the name of "oil of whisky," the trouble and loss consequent upon rectification by charcoal are avoided and an equally pure spirit is obtained.

I have been thus particular in the foregoing description, as this peculiar kind of oil or spirit possesses the property of rendering alcohol and spirits of turpentine capable of combining with each other in proportions in which they do not combine when it is not present, and will also cause spirits of turpentine to combine with whisky or ordinary proof-spirit.

In making my new compound the spirits of turpentine may be the predominating ingredient, which cannot be the case when the compound of this spirit with alcohol is used alone. The proportions may of course admit of some variation, but the following is preferred: two parts of spirits of turpentine, one of alcohol of about 93° above proof, and one of the oil of whisky. Should alcohol of higher proof be used, the spirits of turpentine may be increased; but this is not deemed desirable. The advantage derived from the oil of whisky is such that were it not added as above the alcohol must exceed the turpentine in the proportion of about five to one.

I sometimes combine the oil of whisky with sperm or other oil, with turpentine, and with alcohol, or with the sperm-oil alone, which last combination will take place in any proportions. When I use the four ingredients I prefer to take about four parts of the oil of whisky, one of sperm or other oil, one of spirits of turpentine, and one of alcohol.

The fluid which I have denominated "oil of whisky" has heretofore been thrown away as worthless; but I have, as above stated, applied to a highly useful purpose and obtained a combustible fluid affording a brilliant light at a cost far below that of the ingredients now in use, and which, when combined as above stated, has not its offensive smell developed, but burns without odor.

What I claim as my invention or discovery in the above-described combination of ingredients is—

The use and employment of what I have denominated the "oil of whisky" with spirits of turpentine, alcohol, or lamp oil, in the manner and for the purpose herein set forth.

ISAIAH JENNINGS.

Witnesses:
   THOS. P. JONES,
   GEORGE WEST.